United States Patent
Okamoto et al.

(10) Patent No.: US 8,425,816 B2
(45) Date of Patent: Apr. 23, 2013

(54) SHAPING SLURRY AND SHAPING METHOD

(75) Inventors: Eiji Okamoto, Matsumoto (JP); Toshimitsu Hirai, Hokuto (JP); Kohei Ishida, Suwa (JP)

(73) Assignee: Seiko Epson Corporation (JP)

( * ) Notice: Subject to any disclaimer, the term of this patent is extended or adjusted under 35 U.S.C. 154(b) by 107 days.

(21) Appl. No.: 13/105,080

(22) Filed: May 11, 2011

(65) Prior Publication Data
US 2011/0291326 A1    Dec. 1, 2011

(30) Foreign Application Priority Data
May 26, 2010   (JP) .................................. 2010-120204

(51) Int. Cl.
*B29C 41/22*    (2006.01)
(52) U.S. Cl.
USPC ............ 264/113; 264/463; 264/109; 264/308

(58) Field of Classification Search .................. None
See application file for complete search history.

(56) References Cited

U.S. PATENT DOCUMENTS

| | | | |
|---|---|---|---|
| 5,204,055 A | 4/1993 | Sachs et al. | |
| 2004/0004303 A1* | 1/2004 | Iskra | 264/109 |
| 2008/0018018 A1* | 1/2008 | Nielsen et al. | 264/308 |
| 2011/0024936 A1* | 2/2011 | Collins et al. | 264/78 |

FOREIGN PATENT DOCUMENTS

JP    2729110    12/1997

\* cited by examiner

*Primary Examiner* — Mary F Theisen
(74) *Attorney, Agent, or Firm* — Harness, Dickey & Pierce, P.L.C.

(57) ABSTRACT

A shaping slurry that forms a shaped product with a granule includes: a water-based solvent; a hydrophobic granule that forms the shaped product; and an amphiphatic solid polymer that forms the shaped product, and is dissolved in the water-based solvent.

4 Claims, 4 Drawing Sheets

SHAPING SLURRY AND SHAPING METHOD

BACKGROUND

1. Technical Field

This invention relates to shaping slurries used for shaping, and shaping methods using such shaping slurries.

2. Related Art

The lamination shaping method has been commonly used as a method of rapidly producing a prototype shaped product (rapid prototyping). In the lamination shaping method, a shaped product model created by three-dimensional CAD or the like is divided into multiple two-dimensional cross sectional layers, and a laminate structure corresponding to each two-dimensional cross sectional layer is formed one after another and laminated to form a shaped product. Specifically, for example, as described in Japanese Patent No. 2729110, granules containing ceramics, metals, or the like are formed into a layer. Then, a binding liquid that binds the granules in part of the granule layer is discharged onto the granule layer using, for example, an inkjet droplet discharge apparatus. The binding liquid permeates the space between the granules, and binds the granules to each other upon curing. As a result, a laminate structure corresponding to the two-dimensional cross sectional layer is formed. The formation of the granule layer, and the discharge of the binding liquid are alternately repeated to form a shaped product.

When granules are used as the material that forms the shaped product as above, some of the granules in the granule layer often scatter in response to applied vibrations to the granule layer, or in response to the discharge of the binding liquid to the granule layer. The scattered granules diffuse into the space where the structure is formed, or adhere to the droplet discharge head of the droplet discharge apparatus that discharges the binding liquid. The granules adhered to the droplet discharge head not only contaminate the droplet discharge head, but clog the nozzles in the droplet discharge head, leading to possible droplet discharge failures. Note that these problems related to the scattering of granules are not just the problems of the lamination shaping method using a droplet discharge apparatus, but are commonly shared by a whole range of shaping methods that use granules.

SUMMARY

An advantage of some aspects of the invention is to provide a shaping slurry with which scattering of granules can be suppressed during the shaping procedure using granules, and a shaping method using such shaping slurries.

According to a first aspect of the invention, there is provided a shaping slurry that forms a shaped product with a granule, the shaping slurry including: a water-based solvent; a hydrophobic granule that forms the shaped product; and an amphiphatic solid polymer that forms the shaped product, and is dissolved in the water-based solvent.

According to the first aspect of the invention, the hydrophobic granules that form the shaped product exist in the suspension slurry by being mixed with the water-based solvent and the amphiphatic solid polymer. In the slurry, the hydrophobic moiety of the amphiphatic solid polymer has affinity to the hydrophobic granules, and thus the granules are in the state of being bound to each other via the amphiphatic solid polymer. In other words, the hydrophobic granules are not independent, but are crosslinked to each other via the amphiphatic solid polymer. Thus, the hydrophobic granules remain held together in the granule crosslinked structure even in the presence of vibrations or the like applied to the slurry being formed into a shaped product, and scattering of the granules can be suppressed.

On the other hand, because the hydrophilic moiety of the amphiphatic solid polymer has affinity to the water-based solvent, the hydrophobic granules are also in the state of being dispersed in the water-based solvent via the amphiphatic solid polymer. The hydrophobic granules can thus uniformly disperse in the water-based solvent via the amphiphatic solid polymer. Thus, the hydrophobic granules that form the shaped product uniformly exist in the shaped product formed with the slurry.

Further, because the water-based solvent is used as the solvent that suppresses scattering of the granules, the granules are unlikely to undergo changes in property due to dissolving in the solvent or swelling with the absorbed solvent. Further, because the amphiphatic solid polymer that exhibits the foregoing effects is a constituting material of the shaped product, it is not required to remove the amphiphatic solid polymer from the shaping slurry in forming the shaped product.

The first aspect of the invention may be configured such that the granule is a resin granule, the water-based solvent contains a nonorganic main solvent component, and the amphiphatic solid polymer has a hydrocarbon chain backbone, and a side-chain hydrophilic functional group.

In this case, the granules forming the shaped product are formed of resin, and the solvent that forms the slurry with the granules is nonorganic. Because the solubility of resin for nonorganic solvents is generally small, dissolving of the granules in the solvent, or swelling of the granules with the absorbed solvent can be suppressed more reliably with a resin selected for the granule material, and with a nonorganic solvent selected for the solvent.

Further, in this case, the amphiphatic solid polymer is used that has a hydrocarbon chain backbone, and a side-chain hydrophilic functional group. In this way, the hydrocarbon chain of the amphiphatic solid polymer exhibits hydrophobicity, and guarantees the affinity between the amphiphatic solid polymer and the granules, while the amphiphatic solid polymer's hydrophilic group exhibiting hydrophilicity guarantees the affinity between the amphiphatic solid polymer and the nonorganic solvent.

The first aspect of the invention may be configured such that the amphiphatic solid polymer is polyvinyl alcohol.

As in this case, polyvinyl alcohol may be used as the amphiphatic solid polymer that has affinity to the hydrophobic granules and the water-based solvent. Polyvinyl alcohol has a straight hydrocarbon backbone, and a side-chain hydrophilic hydroxyl group. Because polyvinyl alcohol generally contains a single hydroxyl group per unit structure, polyvinyl alcohol can have high affinity to the water-based solvent, while having affinity to the hydrophobic granules with its backbone. The granules forming the slurry can thus be more uniformly dispersed in the slurry containing polyvinyl alcohol as the amphiphatic solid polymer.

The first aspect of the invention may be configured such that the water-based solvent is water, and that the polyvinyl alcohol has a polymerization degree of from 300 to 1,000, inclusive.

The mechanical strength of structures such as a film containing polyvinyl alcohol increases as the polymerization degree representing the number of polymer unit structures increases. On the other hand, solubility for the water-based solvent decreases with increase in polymerization degree, though the hydroxyl group contained in the unit structure of polyvinyl alcohol exhibits hydrophilicity.

From the standpoint of the mechanical strength of a single slurry layer in the shaped product formed with the slurry, it is preferable to increase the polymerization degree of the polyvinyl alcohol contained in the slurry. However, because increasing the polymerization degree makes the polyvinyl alcohol less soluble in a shaped product formed by laminating slurry layers, the polyvinyl alcohol on the bonding face at the interface of the slurry layers becomes less likely to dissolve in the solvent forming the adjacent layer. In other words, the solubility between the layers lowers, with the result that the adhesion between the layers, and thus the mechanical strength between the layers becomes weak.

Intensive studies conducted by the present inventors over the foregoing background have revealed that the mechanical strength of the slurry layers and the interlayer adhesion could be improved at the same time when the water-based solvent contained in the slurry is water, and when the polyvinyl alcohol has a polymerization degree of from 300 to 1,000, inclusive. Thus, according to this aspect of the invention, the shaping slurry can be used to form a shaped product, regardless of whether the shaped product is formed from a single slurry layer, or from a laminate of slurry layers.

The first aspect of the invention may be configured such that the water-based solvent is water, and that the polyvinyl alcohol has a saponification degree of from 85 to 90, inclusive.

Because the unit structure vinyl alcohol monomer of the polyvinyl alcohol is easily oxidized and is instable, the polyvinyl alcohol is generally produced according to the following procedure.

(a) Polyvinyl acetate is produced by polymerizing the vinyl acetate of the structure obtained by substituting the hydroxyl group of vinyl alcohol with a carboxyl group.

(b) The polyvinyl acetate is subjected to hydrolysis (saponification) to substitute the carboxyl group with a hydroxyl group.

Thus, a group of substances collectively called polyvinyl alcohol includes those having different number ratios of the polyvinyl acetate carboxyl groups to the substituted hydroxyl groups, with respect to the polymerization degree of the polyvinyl acetate. The number ratio of hydroxyl groups with respect to the polymerization degree, in percent, is called a saponification degree, and is used as an index of polyvinyl alcohol properties. For example, the number of carboxyl groups in the polyvinyl alcohol increases and the number of hydroxyl groups decreases as the saponification degree decreases. The hydrophobicity of the polyvinyl alcohol thus increases as a whole. As a result, the solubility for the water-based solvent decreases. On the other hand, the number of carboxyl groups in the polyvinyl alcohol decreases and the number of hydroxyl groups increases as the saponification degree increases. The hydrophilicity of the polyvinyl alcohol thus increases as a whole. As a result, the solubility for the water-based solvent increases. Note, however, that the solubility for the solvent decreases when the polyvinyl alcohol contains hardly any carboxyl group, specifically, when the polyvinyl alcohol has a saponification degree close to 100, because such polyvinyl alcohols easily undergo crystallization.

In this regard, according to the foregoing aspect of the invention, decreases in the solubility of polyvinyl alcohol for water used as the solvent forming the slurry can be suppressed with the use of a polyvinyl alcohol that has a saponification degree of from 85 to 90, inclusive. Decreases in the adhesion between the slurry layers can thus be suppressed.

The first aspect of the invention may be configured such that the shaping slurry contains a fiber material as a constituting material of the shaping slurry.

In this case, the mechanical strength of the slurry can be increased with the fiber material contained in the slurry.

According to a second aspect of the invention, there is provided a shaping method for forming a shaped product by binding granules via a binding liquid, the method including: forming a layer of slurry on a base material, wherein the slurry includes a hydrophobic granule, a water-based solvent, and an amphiphatic solid polymer dissolved in the water-based solvent; bonding the granule and the amphiphatic solid polymer to each other by curing the binding liquid after permeating a portion of the layer with the binding liquid; and flowing a water-based liquid on the layer that includes the cured binding liquid, so as to remove the layer except for the region permeated with the binding liquid.

According to the second aspect of the invention, the slurry as a suspension of the shaped product-forming hydrophobic granules in the water-based solvent is used to form the shaped product. Thus, the hydrophobic granules remain held together in the water-based solvent even in the presence of vibrations or the like applied to the slurry being formed into a shaped product, and scattering of the granules can be suppressed. Further, because the water-based solvent is used as the solvent that suppresses scattering of the granules, the granules are unlikely to undergo changes in property due to dissolving in the solvent or swelling with the absorbed solvent.

Further, according to the second aspect of the invention, the amphiphatic solid polymer having affinity to both the hydrophobic granules and the water-based solvent is added as a constituting material of the slurry. The amphiphatic solid polymer has affinity to the hydrophobic granules at the hydrophobic moiety, and has affinity to the water-based solvent at the hydrophilic moiety. The hydrophobic granules can therefore uniformly disperse in the water-based solvent via the amphiphatic solid polymer. The hydrophobic granules forming the shaped product can thus uniformly exist in the shaped product formed with the shaping slurry.

Further, according to the foregoing second aspect of the invention, the binding liquid is dropped onto the slurry layer, and the region other than the portion permeated with the binding liquid is removed with a water-based liquid after curing the binding liquid. Here, because the slurry forming the layer includes the water-based solvent and the amphiphatic solid polymer, the region other than the portion permeated with the binding liquid can easily be removed with a water-based liquid.

The second aspect of the invention may be configured such that the layer forming step and the bonding step are alternately repeated to form a laminate of multiple layers that includes the cured binding liquid, and that the water-based liquid is flown on the laminate in the removing step to remove the laminate except for the region permeated with the binding liquid.

In this case, by alternately repeating the layer forming step and the bonding step, a laminate of multiple layers can be formed, and the shaped product formed by using the shaping method can have more freedom in terms of shape.

The second aspect of the invention may be configured such that the method further includes a sacrifice layer forming step of forming a sacrifice layer as a lowermost layer on the base material, wherein the sacrifice layer is formed of the slurry, and includes a smaller drop of the binding liquid than the layer formed in the layer forming step.

In this case, the sacrifice layer that includes a smaller drop of the binding liquid than the layer formed in the layer forming step is provided as the lowermost layer on the base material. Thus, the layer forming the shaped product can be detached from the base material by removing the sacrifice layer, or by separating the sacrifice layer and the base material from each other. In this way, the shaped product can be detached from the base material with the maintained accuracy for the shape of the shaped product, particularly at the portion formed by the layer directly above the sacrifice layer, without being affected by, for example, the force that acts on the shaped product.

The second aspect of the invention may be configured such that, in the sacrifice layer forming step, the binding liquid is discretely dropped onto the layer formed into the sacrifice layer, and cured.

In this case, the binding liquid is discretely dropped on the sacrifice layer, and cured. Thus, the shaped product formed in layers can be stably supported by the base material via the cured region of the binding liquid, without making it difficult to detach the sacrifice layer from the base material.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
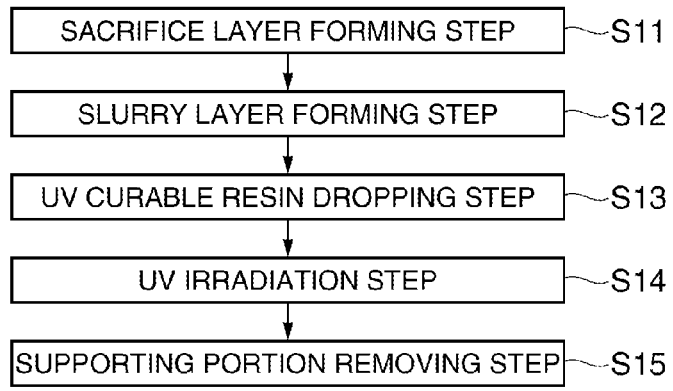
FIG. 1 is a flowchart representing the procedure of a shaping method using a shaping slurry according to an embodiment of the invention.

The following describes an embodiment of a shaping slurry and a shaping method using same, with reference to FIG. 1 to FIGS. 3A to 3C.

Composition of Shaping Slurry

The composition of the shaping slurry is described first.

The shaping slurry of the present embodiment is a suspension of three materials kneaded with each other.

(A) Hydrophobic granules
(B) Water-based solvent
(C) Amphiphatic solid polymer

The hydrophobic granules are the primary constituting material of the shaped product formed with the shaping slurry. The hydrophobic granules may be granules of hydrophobic resin, for example, such as an acrylic resin powder, a silicone resin powder, an acryl silicone resin powder, a polyethylene resin powder, and a polyethylene-acrylic acid copolymer resin powder. Note that the hydrophobic granules of the present embodiment are granules that dissolve no more than 1 g with respect to 100 g of the water-based solvent.

As described above, the hydrophobic granules forming a shaped product have low solubility for the water-based solvent. The hydrophobic granules are thus unlikely to undergo changes in property due to dissolving in the solvent or absorbing the solvent. The water-based solvent is therefore suitable as a medium that suppresses the scattering of the hydrophobic granules. Note that the water-based solvent encompasses water and nonorganic solvents such as an aqueous solution of inorganic salt. Preferably, water is used as the water-based solvent. Further, the water-based solvent may be a mixture of a water-soluble organic solvent added to water.

The amphiphatic solid polymer is a material that forms a shaped product with the hydrophobic granules. By being amphiphatic, the solid polymer dissolves in the water-based solvent with its affinity to the water-based solvent imparted by the hydrophilic moiety, and exhibits dispersive action for the hydrophobic granules in the solvent with its affinity to the hydrophobic granules imparted by the hydrophobic moiety. Materials having a hydrocarbon chain backbone and a side-chain hydrophilic functional group can be used as the amphiphatic solid polymer. Polyvinyl alcohol, more hydrophilic than other materials having a straight hydrocarbon chain, is preferably used.

In the slurry as a kneaded mixture of the three materials, the hydrophobic granules also exist in the state of being crosslinked to each other with the hydrophobic moiety of the amphiphatic solid polymer. Thus, the hydrophobic granules remain held together in the granule crosslinked structure even in the presence of vibrations or the like applied to the slurry being formed into a shaped product, and scattering of the granules can be suppressed.

The hydrophobic granules are uniformly dispersed in the water-based solvent via the hydrophilic moiety of the amphiphatic solid polymer interacting with the hydrophobic granules at the hydrophobic moiety. Thus, the hydrophobic granules uniformly exist in the shaped product formed with the slurry. Note that because the amphiphatic solid polymer itself is material forming the shaped product, it is not required to remove the amphiphatic solid polymer from the shaped product during the formation or after the completion of the shaped product.

The following describes specific examples of (A) hydrophobic granules and (C) amphiphatic solid polymer.

(A) Hydrophobic Granules

The hydrophobic granule powder resin material preferably contains spherical granules. This improves the ease of controlling the shape of the shaped product, particularly at the sides and corners defining the contour of the shaped product.

When a slurry containing the powder resin material is used to form a shaped product using a known lamination shaping method, it is preferable that the powder resin material have a particle size equal to or less than the thickness of the slurry layer formed by the slurry, more preferably not greater than half the thickness of the slurry layer. In this way, the volumetric filling rate of the granules in the slurry layer, and thus the mechanical strength of the shaped product can be improved.

It is also preferable that the powder resin material include granules of different particle sizes within the foregoing particle size range. Note that the particle size distribution in the shaping slurry may have a dispersion close to that of a Gaussian distribution (normal distribution), or a dispersion (skewed dispersion) in which the maximum value of the particle size distribution occurs on the maximum diameter or minimum diameter side. When the particle size of the granules contained in the powder resin material has a single value, the volumetric filling rate of the particles in the shaped product does not exceed the theoretical value of 69.8% for the most densely packed particles. Instead, the actual filling rate is only about 50% to 60%. With the granules of different particle sizes distributed in the powder material, specifically with a range of particle sizes, the volumetric filling rate improves, for example, as the granules of relatively smaller particle sizes are disposed in the spaces created by the granules of relatively larger particle sizes. As a result, the mechanical strength of the shaped product can improve.

For example, when the thickness of the slurry layer is 100 μm, the granules contained in the powder resin material preferably have a particle size of 100 μm or less, more preferably, an average particle size of 20 μm to 40 μm with a dispersion ranging from several micrometers to 100 micrometers or less.

The following is a list of powder resins that satisfy the foregoing conditions.

Examples of silicone resin powder material include Tospearl 1110 (particle size, 11 μm), Tospearl 120 (particle size, 2 μm), Tospearl 130 (particle size, 3 μm), Tospearl 145 (particle size, 4.5 μm), Tospearl 2000B (particle size, 6 μm), and Tospearl 3120 (particle size, 12 μm). Tospearl is a registered trademark of Momentive Performance Materials Inc.

Examples of acryl silicone resin powder include Chaline R-170S (particle size, 30 μm). Chaline is a registered trademark of Nissin Chemical Industry Co., Ltd.

Examples of acrylic resin include Epostar L15 (particle size, 10 to 15 μm), Epostar M05 (particle size, 4 to 6 μm), and Epostar GPH 40 to H110 (particle size, 4 to 11 μm). Epostar is a registered trademark of Nippon Shokubai Co., Ltd.

Examples of polyethylene resin include Flo-Beads LE-1080 (particle size, 6 μm), Flo-Beads LE-2080 (particle size, 11 μm), Flo-Beads HE-3040 (particle size, 11 μm), and Flo-Beads CL-2080 (particle size, 11 μm). Flo-Beads is a registered trademark of Sumitomo Seika Chemicals Co., Ltd.

Examples of ethylene-acrylic acid copolymer resin include Flo-Beads EA-209 (particle size, 10 μm; Sumitomo Seika Chemicals Co., Ltd.).

(C) Amphiphatic Solid Polymer

A preferred example of the amphiphatic solid polymer is polyvinyl alcohol. The structure of polyvinyl alcohol is as follows.

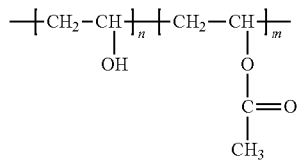

Polyvinyl alcohol has the straight hydrocarbon backbone, and the side chain hydroxyl group (hydrophilic functional group). Polyvinyl alcohol includes a single hydroxyl group per unit structure, and therefore has high affinity to the water-based solvent while also having affinity to the hydrophobic granules with its backbone. Because the monomer vinyl alcohol ($H_2C$=CHOH) of polyvinyl alcohol is easily oxidized and instable, polyvinyl alcohol is generally produced according to the following procedure.

(a) Polyvinyl acetate is produced by polymerizing the vinyl acetate ($H_2C$=CHCOOH) of the structure obtained by substituting the hydroxyl group (—OH) of vinyl alcohol with a carboxyl group (—COOH).

(b) The polyvinyl acetate is subjected to hydrolysis (saponification) to substitute the carboxyl group with a hydroxyl group.

Thus, polyvinyl alcohol also contains a carboxyl group on the side chain, in addition to the hydroxyl group, as shown in chemical formula (1). A group of substances collectively called polyvinyl alcohol includes those having different number ratios of hydroxyl groups with respect to the polymerization degree of the polyvinyl acetate, depending on the extent of hydrolysis. The number ratio of hydroxyl groups with respect to the polymerization degree, in percent, is called a saponification degree, and is used as an index of polyvinyl alcohol properties.

The polymerization degree representing the number of polymerized unit structures in chemical formula (1) is also used as an index of polyvinyl alcohol properties.

The saponification degree and polymerization degree have the following propensities.

Increasing the saponification degree increases hydrophilicity, and thus increases the solubility to the water-based solvent.

Crystallization tends to occur with a saponification degree approaching 100%, and the solubility to the water-based solvent becomes notably low.

Decreasing the saponification degree increases hydrophobicity, and thus decreases the solubility to the water-based solvent.

Increasing the polymerization degree increases the mechanical strength of the structure containing the polyvinyl alcohol.

Decreasing the polymerization degree increases the solubility to the water-based solvent, particularly to cold water.

From the standpoint of the mechanical strength of a single slurry layer in the shaped product formed by using the lamination shaping method, it is preferable to increase the polymerization degree of the polyvinyl alcohol contained in the slurry. However, because increasing the polymerization degree makes the polyvinyl alcohol less soluble, the polyvinyl alcohol on the bonding face at the interface of the slurry layers laminated and bonded to form the shaped product becomes less likely to dissolve in the solvent forming the adjacent layer. In other words, the solubility between the layers lowers, with the result that the adhesion between the layers, and thus the mechanical strength between the layers becomes weak.

Considering this, it is preferable that the polymerization degree of the polyvinyl alcohol range from 300 to 1,000, inclusive, when the water-based solvent contained in the slurry is water. In this way, the mechanical strength of the slurry layers, and the adhesion between the layers can be improved at the same time. It is also preferable that the saponification degree range from 85 to 90, inclusive. In this way, decreases in the solubility of polyvinyl alcohol for water can be suppressed. Accordingly, a decrease in the adhesion between the slurry layers also can be suppressed. More preferably, the polyvinyl alcohol has a polymerization degree of from 300 to 1,000, inclusive, and a saponification degree of from 85 to 90, inclusive. In this way, the mechanical strength of the slurry layers, and the adhesion between the layers can be improved at the same time, and decreases in the solubility of polyvinyl alcohol for water can be suppressed.

The following is a list of polyvinyl alcohols that satisfy the foregoing conditions.

Poval JP-03 (polymerization degree, 300; saponification degree, 86.0 to 90.0 (88)), Poval JP-04 (polymerization degree, 400; saponification degree, 86.0 to 90.0 (88)), Poval JP-05 (polymerization degree, 500; saponification degree, 87.0 to 89.0 (88)), Poval JP-10 (polymerization degree, 1,000; saponification degree, 86.0 to 90.0 (88)), and Poval JP-05S (polymerization degree, 500; saponification degree, 86.0 to 90.0 (88)), all available from Japan Vam & Poval Co., Ltd.

Kuraray Poval PVA-203 (polymerization degree, 300; saponification degree, 87 to 89 (88)), Kuraray Poval PVA-205 (polymerization degree, 500; saponification degree, 86.5 to 89 (87.75)).

Gohsenol GL-05 (polymerization degree 500; saponification degree, 86.5 to 89.0 (87.75)), Gohsenol GL-03 (polymerization degree, 300; saponification degree, 86.5 to 89.0 (87.75). Gohsenol is a registered trademark of Nippon Synthetic Chemical Industry Co., Ltd.

Mixture Ratio

It is preferable to mix (A) the hydrophobic granule Chaline R-1705, (B) the water-based solvent water, and (C) the amphiphatic solid polymer Poval JP-05 in the following proportions.

(A):(B):(C)=7:3.1:0.22 (unit, g)

A shaping slurry can be produced by kneading these materials. Note that the mechanical strength of the shaped product can increase as the filling rate of the hydrophobic granules in the shaped product increases. Thus, from the standpoint of increasing the mechanical strength of the shaped product, it is preferable to set a mixture ratio with which the volume occupied by the water-based solvent and the amphiphatic solid polymer is smaller than the space between the most densely packed hydrophobic granules, so that the hydrophobic granules can be packed most densely.

Shaping Method

A shaping method using the slurry of the foregoing composition is described below with reference to FIG. 1 to FIGS. 3A to 3C.

FIG. 1 represents the procedure of the steps of the shaping method. FIGS. 2A to 2C and FIGS. 3A to 3C are diagrams schematically representing the process performed in each step.

Figure 2A:
FIGS. 2A to 2C are diagrams schematically illustrating the procedure in each step of the shaping method.
Figure 2B:
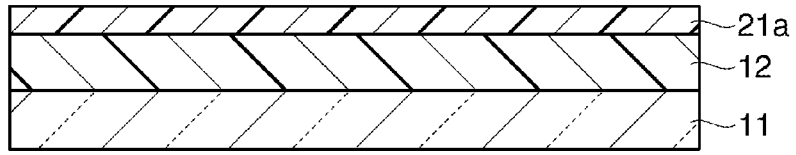
Figure 2C:
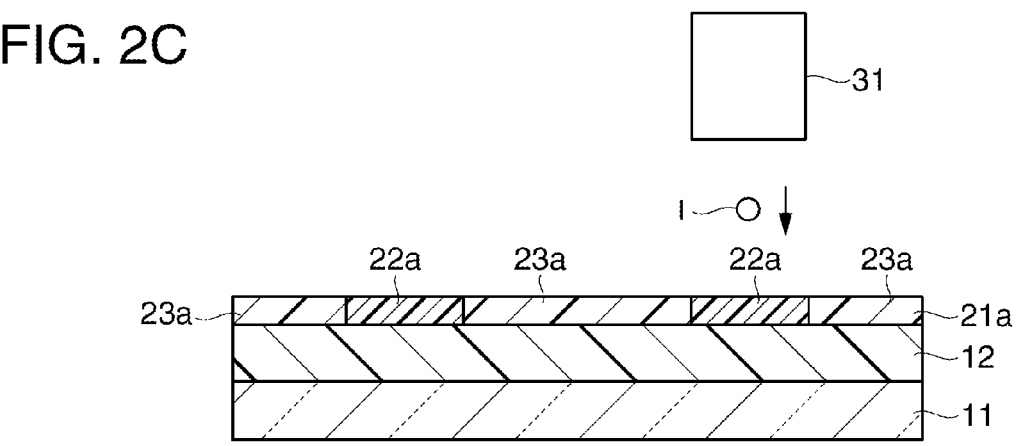

In the shaping method of the present embodiment, the slurry is first applied on a substrate 11 such as a glass substrate and a plastic sheet, in a thickness of, for example, 200 μm, so as to form a sacrifice layer 12 representing the lowermost layer of the slurry layers (sacrifice layer forming step; step S11, FIG. 2A). Note that the slurry can be applied using any known methods such as a squeegee method, a screen printing method, a doctor blade method, and a spin coating method, provided that a slurry layer of a substantially uniform thickness can be formed on the substrate 11.

Then, in the slurry layer forming step (step S12, FIG. 2B), the slurry is applied in a thickness of 100 μm to form a slurry layer 21a. Note that the slurry layer 21a can be formed using known methods such as above, as with the case of the sacrifice layer 12.

Thereafter, in the UV curable resin dropping step (step S13, FIG. 2C), a UV curable resin-containing UV ink I (binding liquid) is discharged from a droplet discharge apparatus 31 onto a shaping portion 22a that forms a part of a shaped product 20 (FIG. 3C) in the slurry layer 21a. In the slurry layer 21a, the hydrophobic granules form a crosslinked structure with the polyvinyl alcohol, and are thus disposed with a predetermined space in between with the water filling the space. Thus, the UV ink I discharged toward the surface of the slurry layer 21a from above the slurry layer 21a passes through the space and reaches the back surface of the slurry layer 21a. In other words, the UV ink I permeates throughout the shaping portion 22a, and improves the strength of the shaping portion 22a. It should be noted that because the polyvinyl alcohol hydrophobic region in the slurry layer 21a has affinity to the UV ink I, the UV ink I can easily permeate the slurry layer 21a.

The UV ink I comes in two forms: one containing a cation polymerized UV curable resin cured by a polymerization reaction that uses cations as active species, and one containing a radical polymerized UV curable resin cured by a polymerization reaction that uses radicals as active species.

The UV ink I used in the present embodiment may be either of these two forms. Note, however, that the UV ink I is cured with the hydrophobic granules contained in the shaping portion 22a, after being dropped onto the shaping portion 22a of the slurry layer 21a. Thus, the materials selected for the UV ink I, particularly the UV curable resin, and for the hydrophobic granules should preferably have affinity to each other. Specifically, it is preferable to use the same group of materials for the UV ink I and the hydrophobic granules, for example, an acryl-based UV ink I for the UV ink I, and an acrylic resin powder for the hydrophobic granules. It is also preferable to use the UV ink I with hydrophobic granules whose surface material is of the same group as the UV ink I. Examples of such UV ink I and hydrophobic granules are acryl-based UV ink I and acrylic silicone resin powder. As used herein, the "same group" means that the backbone of the repeating unit structure of the hydrophobic granules is the same as the backbone of the unit structure of the resin contained in the UV ink I. Further, the "same group" means that the backbones in these unit structures partially overlap to such an extent that the hydrophobic liquid interacts with the resin in substantially the same manner as in the interaction between the hydrophobic granules, though the side-chain functional groups or the backbones in the unit structures are partially different from each other. Thus, when the hydrophobic granules and the resin are copolymers, those with different composition ratios of the atoms also fall in the definition of the same group.

Examples of the radical polymerized UV curable resin include acrylic resin, and unsaturated polyester resin. Examples of acrylic resin include polyester acrylate resin, epoxy acrylate resin, urethane acrylate resin, and polyether acrylate resin.

Examples of the cation polymerized UV curable resin include epoxy resin, oxetane resin, vinyl ether resin, and silicone resin. Examples of silicone resin include acryl silicone resin, polyester silicone resin, epoxy silicone resin, and mercapto silicone resin.

The different forms of UV ink I may include pigments of different colors. Examples of yellow pigment include fast yellow (C. I. Pigment Yellow 74), disazo yellow (C. I. Pigment Yellow 16, C. I. Pigment Yellow 128), and isoindolinone yellow (C. I. Pigment Yellow 109). Examples of magenta pigment include quinacridone magenta (C. I. Pigment Red 122), and unsubstituted quinacridone (C. I. Pigment Violet 19). Examples of cyan pigment include phthalocyanine blue (C. I. Pigment Blue 15:3, C. I. Pigment Blue 15:4). Examples of black pigment include carbon black. Examples of white pigment include titanium oxide. In addition to these pigments, the UV ink I may contain delusterants such as a delustered silicone powder, and a fluorescent pigment.

Thereafter, in the UV irradiation step (step S14, FIG. 3A), the slurry layer 21a is irradiated with ultraviolet rays L as a whole to cure the shaping portion 22a. Note that the irradiation of ultraviolet rays L is not required to cover the whole area of the slurry layer 21a, provided that at least the shaping portion 22a of the slurry layer 21a is irradiated. Further, the irradiation of ultraviolet rays L may be performed alternately with the dropping of the UV ink I on the shaping portion 22a, using, for example, a UV irradiator installed in the droplet discharge apparatus 31, or may be performed for each slurry layer one at a time, or at once for more than one slurry layer, using a UV irradiator separately provided from the droplet discharge apparatus 31.

Figure 3A:
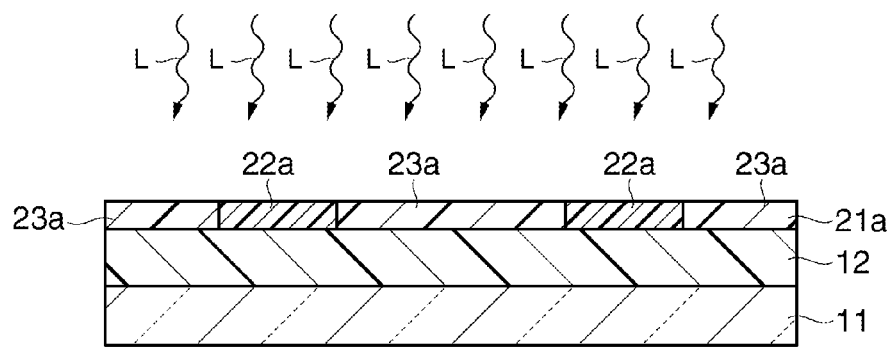
FIGS. 3A to 3C are diagrams schematically illustrating the procedure in each step of the shaping method.
Figure 3B:
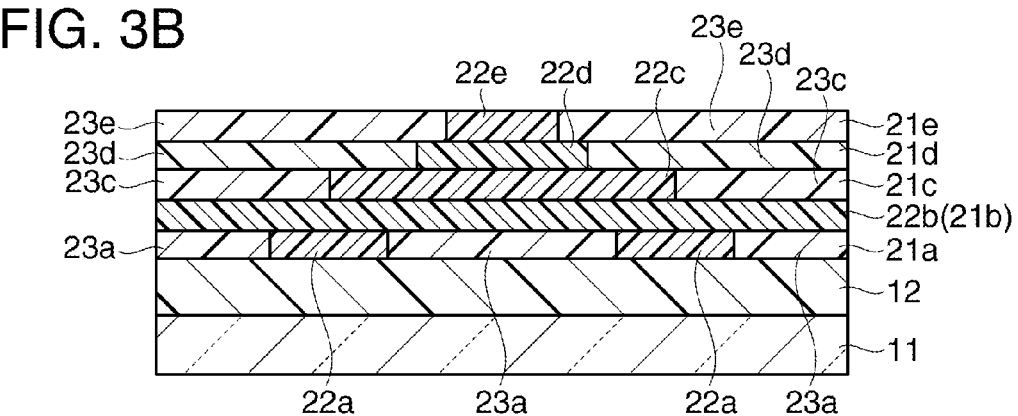

The shaping portion 22a targeted by the UV ink I and cured by irradiation of ultraviolet rays L becomes a part of the shaped product 20. The region of the slurry layer 21a other than the shaping portion 22a serves as a supporting portion 23a that mechanically supports the shaping portion 22a formed in the same slurry layer 21a, and the shaping portion 22b formed on the slurry layer 21b or elsewhere above the slurry layer 21a. In this way, for example, even when the shaped product 20 has an overhang portion in the upper layer shaping portion 22b over the lower layer shaping portion 22a in a direction perpendicular to the laminate direction as illustrated in FIG. 3B, it is not required to form an additional supporting portion for supporting the overhang portion. Further, because the shaped product 20 is formed in the presence of the slurry layer underneath the overhang portion, breaking of the projecting portion during the formation of the shaped product 20 can be suppressed. Note that the UV curable resin dropping step and the UV irradiation step together represent the bonding step.

The three steps from the slurry layer forming step (step S12) to the UV irradiation step (step S14) are repeated until all the shaping portions are formed in the shaped product 20. For example, the three steps are repeated in order 5 times when the shaped product 20 has a five-layer structure including the slurry layers 21a, 21b, 21c, 21d, and 21e as illustrated in FIG. 3B. A laminate of multiple layers can thus be formed by repeating the four steps from the layer forming step to the UV irradiation step in order. The shaped product 20 formed by using the shaping method thus has more freedom in terms of shape.

Figure 3C:
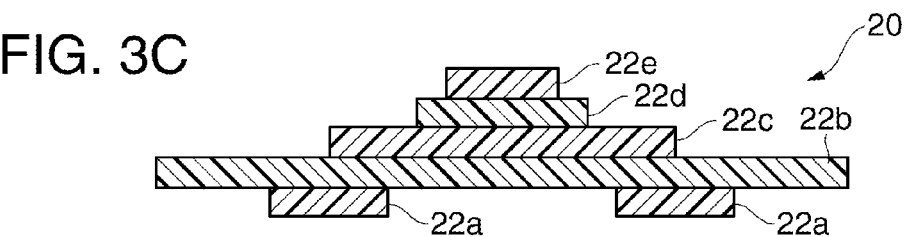

Upon forming all of the shaping portions 22a, 22b, 22c, 22d, and 22e for the shaped product 20, the supporting portions 23a, 23c, 23d, and 23e are removed from the laminate of the slurry layers 21a, 21b, 21c, 21d, and 21e in the supporting portion removing step (step S15, FIG. 3C). The supporting portions 23a, 23c, 23d, and 23e can be removed by, for example, dipping the laminate with the substrate 11 in a water-based liquid, for example, in water, or by spraying a predetermined pressure of water against the laminate. Note that a decrease in the solubility of the slurry layer for water can be suppressed when the polyvinyl alcohol as a constituting material of the slurry has a polymerization degree of from 300 to 1,000, inclusive, and a saponification degree of from 85 to 90, inclusive. The configuration including the polyvinyl alcohol with the foregoing ranges of polymerization degree and saponification degree is therefore preferable in terms of easy removal of only the supporting portions 23a, 23c, 23d, and 23e from the laminate in the supporting portion removing step (step S15).

Note that the water used in the supporting portion removing step contains the hydrophobic granules that form the supporting portions 23a, 23c, 23d, and 23e. As described above, the hydrophobic granules forming the supporting portions 23a, 23c, 23d, and 23e are poorly soluble in water, and thus can be extracted by, for example, filtering the water.

Specifically, the supporting portion removing step may be followed by a hydrophobic granule extracting step. The extracted hydrophobic granules can be reused as slurry material.

EXAMPLES (A) Chaline R-1705, (B) water, and (C) various Povals were mixed in the following proportions to form a slurry.

(A):(B):(C)=7:3.1:0.22 (unit, g)

Five different Povals (JP-05, JP-15, JP-24, JT-05, JT-15) with different polymerization degrees and different saponification degrees were used. The slurries were evaluated with regard to the fixing strength between slurry layers laminated at 23° C., and solubility for 18° C. cold water. The fixing strength was evaluated by measuring the tensile elastic modulus according to the methods of JISK7161 and JISK7162. Table 1 below presents the evaluation results for the fixing strength and solubility of the slurries using the different Povals.

TABLE 1

| Product | Polymerization degree | Saponification degree | Fixing strength | Solubility |
| --- | --- | --- | --- | --- |
| JP-05 | 500 | 88 | Good | Excellent |
| JP-15 | 1,500 | 87 | Good | Good |
| JP-24 | 2,400 | 88 | Acceptable | Acceptable |
| JT-05 | 500 | 94 | Acceptable | Acceptable |
| JT-15 | 1,500 | 93 | Good | Acceptable |

As presented in Table 1, among the Povals having saponification degrees within a range of from 85 to 90 (JP-05, JP-15, JP-24), the solubility is the highest in JP-05 having the smallest polymerization degree, and is the lowest in JP-24 having the largest polymerization degree. The fixing strength was about the same for JP-05 and JP-15, and was lower in JP-24. It can be said from this that the solubility of the slurry is specified by the polymerization degree, because the solubility of the Poval attributed to the saponification degree is guaranteed in the optimum saponification degree range of from 85 to 90. It can also be said that the fixing strength and solubility both become desirable as the polymerization degree of the Poval decreases.

On the other hand, Povals having saponification degrees greater than 90 (JT-05, JT-15) had lower solubility than JP-05 and JP-15 having the same polymerization degrees but lower saponification degrees, regardless of the value of polymerization degree. This is believed to be due to the large saponification degree above 90, which causes the Povals to easily crystallize and lowers solubility for water. JT-15 having a larger polymerization degree than JT-05 had higher fixing strength between the slurry layers.

This is considered to be due to the property of JT-15 to be more soluble between the slurry layers with its higher polymerization degree with greater numbers of uncrystallized unit structures per polymer, assuming that JT-05 and JT-15 have substantially the same polymerization degree per polymer unit.

As described above, the shaping slurry and the shaping method using the slurry according to the present embodiment have a number of advantages, as follows.

(1) The slurry is formed using the water-based solvent water, the hydrophobic resin granules, and the amphiphatic solid polymer polyvinyl alcohol. The resin granules forming the shaped product 20 thus exist in the suspension slurry by being mixed with water and polyvinyl alcohol. Further, because the hydrocarbon chain in the polyvinyl alcohol has affinity to the resin granules in the slurry, the granules are in the state of being bound to each other via the polyvinyl alcohol. Specifically, the resin granules are not independent, but are crosslinked to each other via the polyvinyl alcohol. Thus, the resin granules remain held together in the granule crosslinked structure even in the presence of vibrations or the like applied to the slurry being formed into the shaped product 20, and scattering of the granules can be suppressed.

(2) Because the hydroxyl groups of the polyvinyl alcohol have affinity to water, the resin granules are in the state of being dispersed in water via the polyvinyl alcohol. The resin granule can therefore uniformly disperse in water via the polyvinyl alcohol. The resin granules forming the shaped product 20 can thus uniformly exist in the shaped product 20 formed from the slurry.

(3) Because water is used as the solvent that suppresses scattering of the granules, the granules are unlikely to undergo changes due to dissolving in water or swelling with the absorbed solvent.

(4) Because the polyvinyl alcohol is a constituting material of the shaped product, it is not required to remove the polyvinyl alcohol from the shaping slurry in forming the shaped product 20.

(5) Polyvinyl alcohol having a polymerization degree of from 300 to 1,000, inclusive, is used as a constituting material of the slurry. In this way, the mechanical strength of the slurry layers, and the adhesion between the layers can be improved at the same time. The shaping slurry can thus be used to form the shaped product regardless of whether it is formed from a single slurry layer or from a laminate of slurry layers.

(6) Polyvinyl alcohol having a saponification degree of from 85 to 90, inclusive, is used as a constituting material of the slurry. In this way, a decrease in the solubility of polyvinyl alcohol for water, and thus a decrease in the adhesion between the slurry layers can be suppressed.

Note that the embodiment described above may be appropriately modified, as follows.

The binding liquid is not limited to the UV ink I that contains UV curable resin, and may be realized by a heat curable resin-containing liquid.

The formation of the slurry layers 21a, 21b, 21c, 21d, and 21e may be followed by a drying step of drying the slurry layers 21a, 21b, 21c, 21d, and 21e. The slurry layers 21a, 21b, 21c, 21d, and 21e may be dried by completely drying the water contained in these layers, or may be dried to such an extent that the water content of the slurry layers 21a, 21b, 21c, 21d, and 21e remains the same as in the atmosphere, specifically, in the balanced state with the atmosphere. Note that even when the slurry layers 21a, 21b, 21c, 21d, and 21e are completely dried, the interlayer adhesion can be maintained as the polyvinyl alcohol in the lower slurry layer dissolves in the water contained in the upper slurry layer.

The irradiation of ultraviolet rays L was performed after dropping the UV ink I in the shaping portions 22a, 22b, 22c, 22d, and 22e of the slurry layers 21a, 21b, 21c, 21d, and 21e. However, the shaping portion 22b may be formed solely from the UV ink I without forming the slurry layer 21b, when the whole layer is the shaping portion 22b, for example, as in the slurry layer 21b.

The sacrifice layer 12 was formed solely from the slurry. However, a fixing portion 12a that improves the fixing strength of the shaped product 20 for the substrate may be formed by dropping the UV ink I over the whole area of the sacrifice layer 12 in a discrete fashion. A shaping method using the fixing portion 12a is described below in detail with reference to FIGS. 4A to 4D and FIGS. 5A to 5C.

Figure 4A:
FIGS. 4A to 4D are diagrams schematically illustrating the procedure in each step of a shaping method according to a variation of the embodiment of the invention.
Figure 4B:
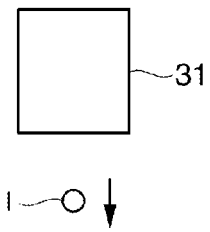
Figure 4B:
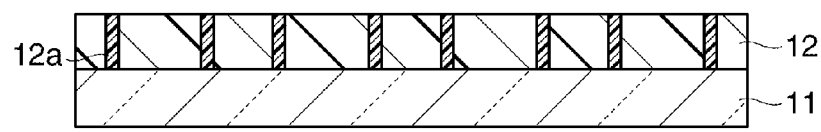
Figure 4C:
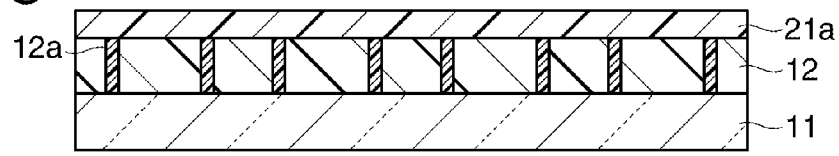

First, the slurry is applied on the substrate 11 in a thickness of, for example, 200 μm to form the sacrifice layer 12 (FIG. 4A). Then, the UV ink I is discretely dropped over the whole area of the sacrifice layer 12 with the droplet discharge apparatus 31 (FIG. 4B). The UV ink I is then cured with the hydrophobic granules residing in the region permeated with the UV ink I, so as to form the fixing portion 12a. Note that the UV ink I may be cured immediately after the discrete dropping of the UV ink I in FIG. 4B, or simultaneously with the curing of the shaping portion 22a in the slurry layer 21a formed on the sacrifice layer 12. Further, the fixing portion 12a should be formed at least directly below the region of the shaping portion 22a in the slurry layer 21a formed directly above the sacrifice layer 12.

Figure 4D:
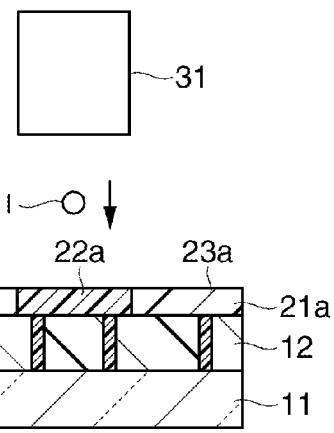
Figure 5A:
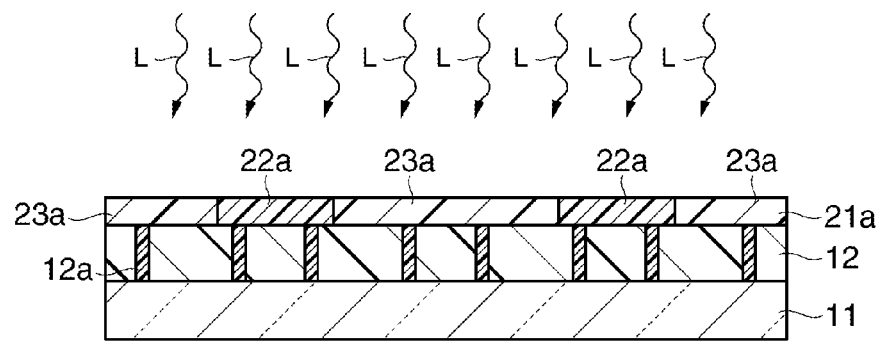
FIGS. 5A to 5C are diagrams schematically illustrating the procedure in each step of a shaping method according to a variation of the embodiment of the invention.
Figure 5B:
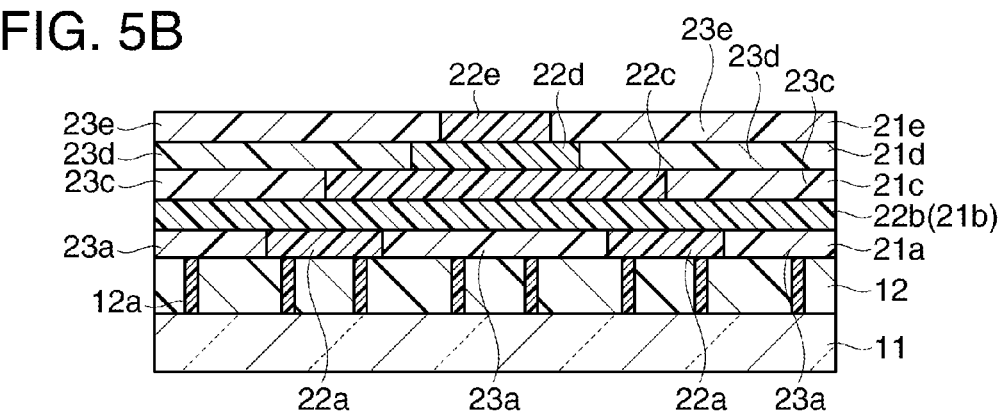

Thereafter, the slurry layer 21a is formed on the sacrifice layer 12 in a thickness of, for example, 100 μm (FIG. 4C), and the UV ink I is dropped on the shaping portion 22a of the slurry layer 21a with the droplet discharge apparatus 31 (FIG. 4D). This is followed by the whole irradiation of the slurry layer 21a with ultraviolet rays L to cure the shaping portion 22a (FIG. 5A). The slurry layer formation, the UV ink I dropping, and the shaping portion curing are repeated, for example, 5 times (FIG. 5B).

Figure 5C:
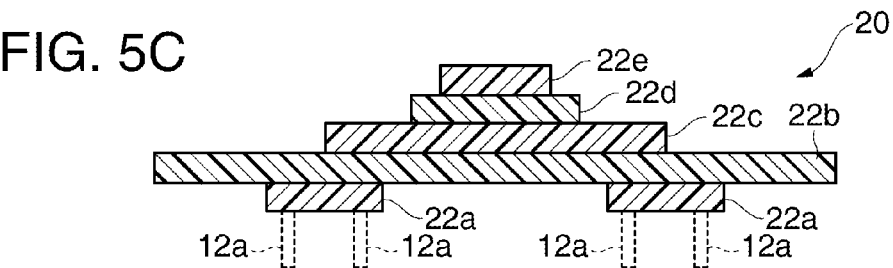

Finally, the supporting portions 23a, 23c, 23d, 23e around the shaping portions 22a, 22b, 22c, 22d, and 22e are removed (FIG. 5C). Here, the sacrifice layer 12 is detached from the substrate 11 with the fixing portion 12a. Note that the fixing portion 12a formed in the sacrifice layer 12 directly below the supporting portion 23a can be removed by removing the supporting portion 23a. On the other hand, the fixing portion 12a formed directly below the shaping portion 22a needs to be mechanically or chemically removed.

With the fixing portion 12a provided in the sacrifice layer 12, the shaping portion 22a forming the shaped product 20 can be more stably supported by the substrate 11.

The sacrifice layer 12, formed on the substrate 11 prior to forming the slurry layers 21a, 21b, 21c, 21d, and 21e that form the shaped product 20, may not be provided.

The shaped product 20 was described as being formed from the five slurry layers 21a, 21b, 21c, 21d, and 21e. However, the number of layers is not limited to this, and the shaped product 20 may be formed from any number of one or more layers. The shape of the structure formed by each slurry layer is not limited either.

The resin granules may have a non-spherical shape such as an ellipsoid, provided that the shape of the shaped product 20 can be controlled.

Hydrophobic particles of a different group from the UV curable resin, or hydrophobic particles that do not have a surface material of the same group also may be used.

The slurry may contain a fiber material such as an acetate fiber. In this way, the mechanical strength of the shaped product formed with the slurry can be improved.

The saponification degree of the polyvinyl alcohol may fall outside of the 85 to 90 range, provided that the polyvinyl alcohol does not precipitate in the slurry water-based solvent.

The polymerization degree of the polyvinyl alcohol may fall outside of the 300 to 1,000 range, provided that solubility redevelops between the slurry layers.

The amphiphatic solid polymer is not limited to polyvinyl alcohol, provided that it mediates the binding of the hydrophobic granules, and enables the hydrophobic granules to be uniformly dispersed in the water-based solvent.

The amphiphatic solid polymer is not limited to those including the hydrocarbon chain backbone and the side-chain hydrophilic functional group, provided that it includes a hydrophobic moiety and a hydrophilic moiety, and that the polymer lies between the hydrophobic granules with its hydrophobic moiety, and can be dispersed in the water-based solvent with its hydrophilic moiety.

The hydrophobic granules are not limited to resin granules, and may be other hydrophobic granules such as silicon oxide having surface hydrophobicity.

The hydrophobic granules may be one having a surface hydrophilic group.

The water-based solvent is not limited to water, and may be nonorganic water-based solvents such as an aqueous solution of inorganic salt.

The water-based solvent may be a mixture of a water-soluble organic solvent added to water.

The water-based solvent is not limited to nonorganic solvents, and those containing organic main components, including, for example, alcohols such as ethanol and n-propanol; polyhydric alcohols such as diethylene glycol and glycerin; and pyrrolidones may also be used, provided that the shape of the shaped product 20 can be controlled. Note that, in this case, the hydrophobic fluid that forms the shaped product 20 is preferably one that has low solubility for organic solvents such as silicon oxide.

The UV ink I was dropped onto the slurry layers 21a, 21b, 21c, 21d, and 21e using the droplet discharge apparatus 31. However, any method can be appropriately used, as long as the UV ink I can permeate the slurry layers 21a, 21b, 21c, 21d, and 21e.

The entire disclosure of Japanese Patent Application No. 2010-120204, filed May 26, 2010 is expressly incorporated by reference herein.

What is claimed is:

1. A shaping method for forming a shaped product by binding granules via a binding liquid, the method comprising:

forming a layer of slurry on a base material, wherein the slurry includes a hydrophobic granule, a water-based solvent, and an amphiphatic solid polymer dissolved in the water-based solvent;

bonding the granule and the amphiphatic solid polymer to each other by curing the binding liquid after permeating a portion of the layer with the binding liquid; and flowing a water-based liquid on the layer that includes the cured binding liquid, so as to remove the layer except for the region permeated with the binding liquid.

2. The shaping method according to claim 1, wherein the layer forming step and the bonding step are alternately repeated to form a laminate of a plurality of layers that includes the cured binding liquid, and wherein the water-based liquid is flown on the laminate in the removing step to remove the laminate except for the region permeated with the binding liquid.

3. The shaping method according to claim 1, further comprising forming a sacrifice layer as a lowermost layer on the base material, wherein the sacrifice layer is formed of the slurry, and includes a smaller drop of the binding liquid than the layer formed in the layer forming step.

4. The shaping method according to claim 3, wherein, in the sacrifice layer forming step, the binding liquid is discretely dropped onto the layer formed into the sacrifice layer, and cured.

* * * * *